3,210,421
TRIS-(AMIDOXIME METHYL) AMINE
Norman Rainer, North Bellmore, N.Y., assignor, by mesne assignments, to Hampshire Chemical Corporation, Nashua, N.H., a corporation of Delaware
No Drawing. Filed Aug. 6, 1962, Ser. No. 214,810
1 Claim. (Cl. 260—564)

This invention relates to novel alpha amino amidoximes, derivatives thereof, and methods for their production and utilization.

It is an object of this invention to provide novel alpha amino amidoximes useful as chelating agents and as chemical intermediates.

It is another object of this invention to provide a novel process for the production of water-soluble alpha amino amidoximes from organic polynitriles.

Other objects and advantages will become apparent hereinafter.

The objects of this invention are accomplished in general by treating a cyanomethylamine compound represented by the formula:

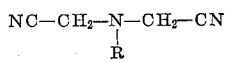

wherein R is hydrogen or an organic radical, with hydroxyl amine in a basic solution of said cyanomethylamine compound, and obtaining thereby an alpha amino amidoxime represented by the formula:

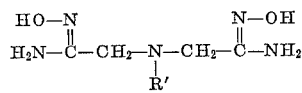

wherein R' is hydrogen or an organic radical.

The cyanomethylamine compounds employed in the process of this invention are in general commonly available or are easily prepared by the well known reaction of formaldehyde and HCN with a primary amine or ammonia, as described in U.S. Patent 3,038,868 and in Luskin, et al. J. Am. Chem. Soc. 78, 4042 (1956). Either mono or poly primary amines may be employed, with concordant formation of one or more cyanomethylamine groups in a molecule. When ammonia is employed for the production of the cyanomethylamine compound, iminodiaceto nitrile (R is H) or nitrilotriaceto nitrile (R is —CH$_2$CN) may be obtained, depending upon selection of stoichiometry. The hydrogen atoms on the cyanomethyl group may be replaced by other groups for suitable property modifications. Thus, for example, the fluorinated nitrilotriaceto nitrile compound, tris (cyano difluoromethyl) amine, leads to the production of amidoximes having modified chelating abilities. When a mono primary amine is employed, N-substituted iminodiacetonitrile compounds are obtained; typical N-substituents ( or R groups) being methyl, 2-ethyl hexyl, stearyl, cyclohexyl, benzyl, and other hydrocarbon radicals, 2-hydroxy ethyl, poly (oxyethylene), 2-ethoxyethyl, and other aliphatic oxygen and sulphur derivatives. When a di-primary amine is employed for the production of the cyanomethylamine compound, typical representative compounds produced include: ethylenediamine tetraacetonitrile, diethylene triamine pentaacetonitrile, hexane 1,6 bis dicyanomethylamine, xylylene bis dicyanomethylamine, and related substituted compounds. The cyanomethylamine compounds employed in the practice of this invention contain at least one N,N bis cyanomethylamine group. The group R may thus be hydrogen, cyanomethyl, alkyl, or aryl, and may contain other N,N bis cyanomethylamine groups.

The reaction process of this invention is generally carried out in an organic liquid medium, preferably one which will dissolve the cyanomethylamine reactant but not the amidoxime reaction product, thereby facilitating recovery of the alpha amino amidoxime. In certain instances however, it may not be required that the amidoxime be isolated prior to use, in which cases a mutual solvent media may be employed. In general, liquid media such as alcohols, ethers, amides and esters are found suitable. An amount of liquid media is selected to provide a reactant concentration of about 20%–80%.

In general, one mole of hydroxylamine is employed per mole of cyanomethyl groups. In view of the activating effect of the alpha amino group, the reaction occurs with unexpected facility and is mildly exothermic. About one to four hours are generally required for initiation and completion of the reaction at temperatures of 40° C. to 100° C. at the preferred concentration levels. Isolation of the amidoxime product may be accomplished by cooling the reaction mixture to facilitate precipitation. The amidoxime products are generally obtained as water soluble white crystalline materials when R' is a small group. However, when R' is large or contains oleaginous groups, oily or paste products may result. The products may in general be purified by methods such as: washing, re-crystallization, fractional precipitation from solvent-nonsolvent mixtures, and chromatographic adsorption on elution columns. Analytical methods useful in characterizing the products are: elemental analyses, infra-red spectrophotometric anaylsis, acid-base titrations in water or glacial acetic acid, nuclear magnetic resonance spectra of hydrogen atoms, preparation and analysis of chemical derivatives and degradation products, and other conventional physical and chemical methods of identification.

In certain embodiments of the present invention, it is found preferable to include other reactive agents with the hydroxylamine so as to cause two different reactions to occur simultaneously, thereby providing mixed derivative products. For example, when primary or secondary aliphatic amines and water are employed in admixture with the hydroxylamine reactant, products are obtained wherein some of the nitrile groups have been converted to amidoxime groups, and some nitrile groups have been converted to N-alkylamides; the following equation being representative:

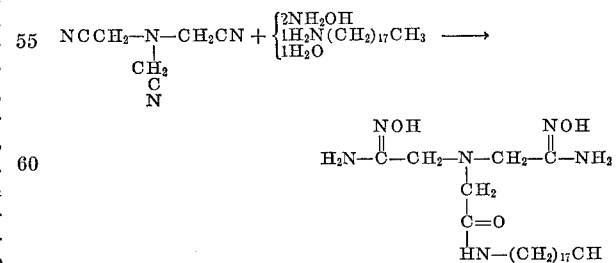

The mixed amidoxime products thereby obtained are frequently of considerable value in specialized applications. For example, the above-exemplified mono N-stearylamide bis amidoxime derivative of nitrilotriacetonitrile, is useful as a surface-active chelating agent. Other reagents reactive toward nitrile groups should preferably be added to the reaction mixture after addition and reaction of the hydroxylamine, thereby minimizing the occurrence of conflicting reactions. Other reactive reagents include dicyandiamide, which forms triazine rings with nitriles; hydrogen peroxide, which hydrolyzes nitrile groups to amides; chemical reducing agents; and other reactive species.

The alpha amino amidoximes of this invention, in view of their critical spatial arrangement and balance of electrophillic centers, are water-soluble and function as chelating agents for metal ions such as nickel, iron, copper, gold, and uranium. The metal-amidoxime chelate compounds are soluble in mildly acidic to alkaline solutions, and frequently exhibit intense colorations such as red-brown for iron and blue-green for nickel. The nonionic alpha amino amidoximes are compatible with anionic and cationic systems. Strong acid systems are to be avoided however, in view of the tendency of the amino amidoxime compounds to undergo hydrolysis under these conditions. The metals can generally be recovered from the chelate compounds by precipitation by hydrogen sulfide from solutions made basic with an alkali metal hydroxide.

The group R' in the alpha amino amidoximes of this invention is essentially analogous to the group R of the cyanomethylamine reactant, except that any cyanomethyl substituents which were in R may now exist as amidoxime or other chemical derivatives of the nitrile groups such as amide, carboxylates, imidazolines, or triazines. Ionic substituents in R' are to be avoided however, when a chelating compound is desired which is relatively unaffected by the pH of aqeuous systems. Improved chelating properties are generally obtained when R' is a methylene-joined organic radical, i.e. a radical which is not wholly aromatic. Ketone and aldehyde groups are generally undesirable in the group R of the cyanomethylamine since the lead to unwanted ketoxime and aldoxime formation.

The amidoxime compounds of this invention are also useful as intermediates for the preparation of primary amines by catalytic hydrogenation. It is generally known that the cyanomethylamine compounds cannot be hydrogenated to the corresponding primary amines due to various intercondensations, rearrangements, and catalyst poisoning. The amidoximes of this invention can however be catalytically hydrogenated at pressures of 2000–3000 p.s.i. to the corresponding primary amines. For example, in the case of nitrilotriacetonitrile, the following equations represent the typical reaction sequence in obtaining an amine product by the method of this invention:

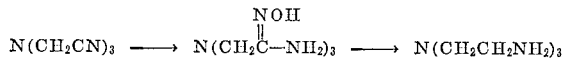

The primary amine thereby obtained is amenable to subsequent cyanomethylation; and the cycle of amidoxime formation, reduction, and cyanomethylation may be continued to produce a three dimensional tertiary ethylene amine structure terminated with either amidoxime, amine, or cyano groups. The third generation, amine terminated tertiary ethylene polyamine, which may be obtained in about 55% yield from nitrilotriacetonitrile, has a molecular weight of 920 and is useful as a thickening agent and condensation polymer component.

The following examples serve to illustrate the invention but they are not intended to limit it thereto. All parts and percentages are by weight unless otherwise indicated.

*Example I*

One hundred and thirty four grams (1.0 mole) of nitrilotriacetonitrile and 1500 milliliters of anhydrous methanol are charged to a 3 liter, three necked flask provided with agitator, addition funnel, condenser, and external cooling means. 105.6 grams (3.2 moles) of anhydrous hydroxylamine are slowly added to the stirred mixture over a half hour period. With continuous stirring, the nitrilotriacetonitrile dissolves and the homogeneous mixture generates an autogenous temperature of 57° C. Stirring is continued until the mixture cools down to room temperature (24° C.), during which time a granular white precipitate forms. The mixture is cooled to 0° C. and maintained at this temperature for one-half hour. The mixture is then filtered while cold. The filter cake is washed twice with anhydrous methanol and then placed in a vacuum dessicator in the presence of $P_2O_5$ for 24 hours. The dried product, tris (amidoxime methyl) amine, weighs 194 grams, representing an 83.3% yield base upon the nitrilotriacetonitrile. The product is a fine white powder, M.P. 112° C. It is soluble in water, and decolorizes potassium permanganate. Aqueous solutions dissolve iron oxide, forming intense red-brown solutions, and dissolve water-insoluble nickel compounds. Nickel cannot be precipitated from its amidoxime chelate solution with $H_2S$ unless the solution is made strongly basic with potassium hydroxide. This characteristic is a good qualitative indication of highly stable chelated metal compounds.

*Example II*

Three hundred and forty-six grams (1.0 mole) of N stearyl, N,N bis (cyanomethyl) amine, one liter of anhydrous methanol, and 500 milliliters of dimethyl formamide are charged to a 3 liter, three necked flask provided with agitator, addition funnel, and condenser. 75.9 grams (2.3 moles) of anhydrous hydroxylamine are added to the stirred mixture, and stiring is maintained for six hours. The resulting solution is clear except for a tendency toward foaming. A 100 milliliter portion of the solution is taken and mixed with one liter of deionized water. Into the resultant solution are immersed corroded iron pipes. Contact of the corroded metal with the chelating solution is maintained for six hours at 50° C. with mild agitation. The resulting red solution is then submitted to high shear aeration, whereupon a red froth forms on the solution surface. By repeated frothing and removal of the surface foam, most of the red color, and consequently most of the chelated iron, is removed from the solution.

*Example III*

Two hundred and sixteen grams (1.0 mole) of ethylenediamine tetraacetonitrile, one liter of anhydrous methanol, and 500 milliliters of dimethyl formamide are charged to a three liter, 3 necked flask provided with agitator, addition funnel, and condenser. 99 grams (3.0 moles) of anhydrous hydroxylamine are added to the stirred mixture, and stirring is maintained for six hours. 700 milliliters of methanol are then removed from the flask by evaporation at 18° C. under mild vacuum. 500 milliliters of water and 241 grams (1.0 mole) of di-2-ethyl hexylamine are subsequently added to the flask. The mixture is heated at 70° C. for seven hours with continuous agitation, during which time ammonia emanates as a reaction by-product. The mixture is then subjected to vacuum evaporation to remove all volatile material. 552 grams of the product, tris N,N,N' (amidoxime methyl), mono N'(NΔ, NΔ, bis 2 ethyl hexyl acetamido) ethylene diamine, are obtained as a soft paste. The paste product forms a chelate compound with tin which is compatible with polyvinylchloride plastisol compositions. In said plastisol compositions, the tin chelate compound serves as a stabilizer against the degradative effects of heat and ultra violet light.

As many widely different embodiment may be employed or made without departing from the spirit and scope of this invention, it is to be understood that the invention is to be in no wise restricted save as set forth in the appended claim.

I claim:

The compound represented by the formula:

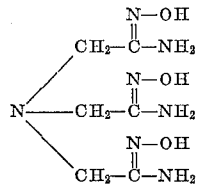

References Cited by the Examiner

UNITED STATES PATENTS 2,902,514   9/59   De Benneville et al. ____ 260—564
2,947,782   8/60   De Benneville et al. __ 260—564 X

FOREIGN PATENTS 840,878   7/60   Great Britain.

OTHER REFERENCES

Degering; "An Outline of Organic Nitrogen Compounds," pp. 398 and 508 (1945).

Pearse et al.: J.A.C.S., vol. 81, pp. 6505–6508 (1959).

CHARLES B. PARKER, *Primary Examiner.*